Figure 1:
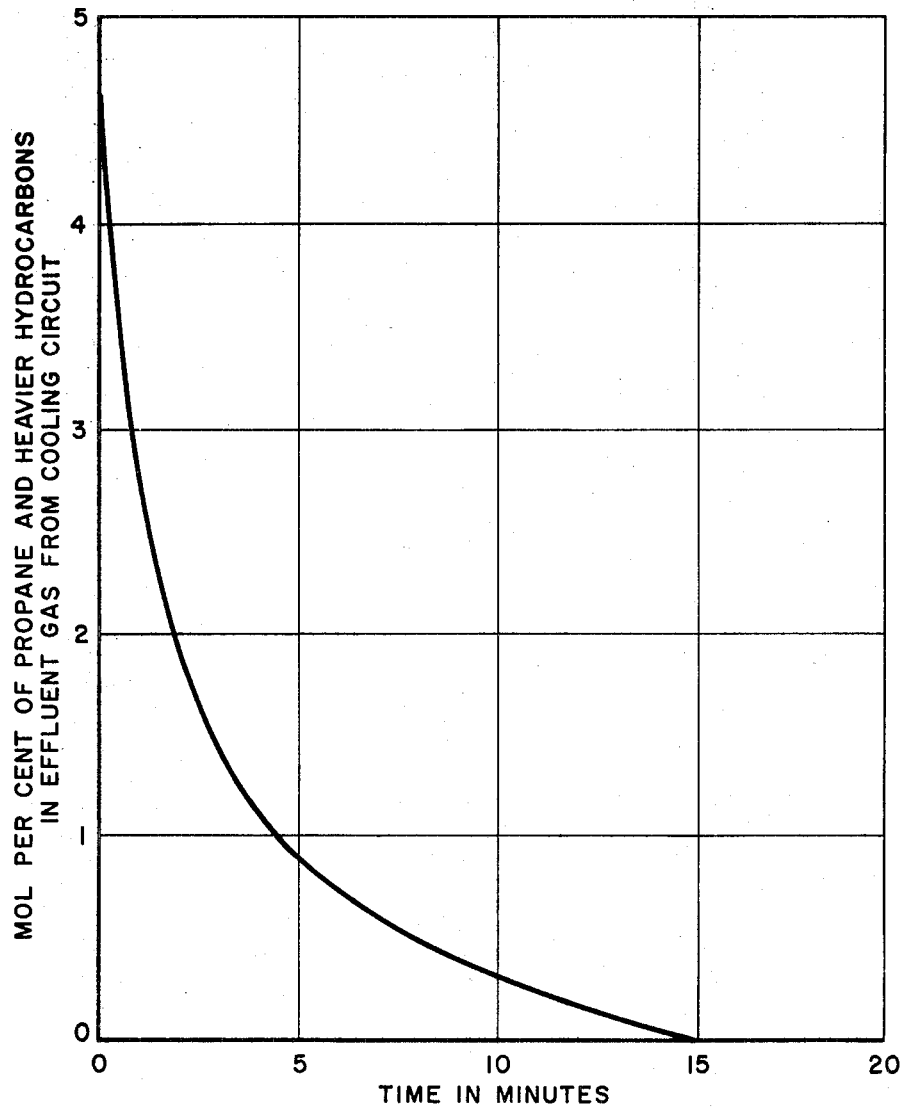

United States Patent

[11] 3,577,867

[72] Inventor Clem A. Barrere, Jr.
Ponca City, Okla.
[21] Appl. No. 753,487
[22] Filed Aug. 19, 1968
[45] Patented May 11, 1971
[73] Assignee Continental Oil Company
Ponca City, Okla.

[54] METHOD FOR COOLING HEATED ADSORBENT BEDS
15 Claims, 2 Drawing Figs.

[52] U.S. Cl. .................................................. 55/62, 55/180
[51] Int. Cl. .................................................. B01d 53/04
[50] Field of Search .......................................... 55/59, 62, 74, 75, 76, 179, 180

[56] References Cited
UNITED STATES PATENTS

| | | | |
|---|---|---|---|
| 2,880,818 | 4/1959 | Dow | 55/62 |
| 3,008,539 | 11/1961 | Francis, Jr. | 55/62 |
| 3,109,722 | 11/1963 | Dow | 55/21 |
| 3,121,002 | 2/1964 | Kilgore et al. | 55/180X |
| 3,238,701 | 3/1966 | Holt | 55/20 |
| 3,479,797 | 11/1969 | Spencer et al. | 55/62 |

*Primary Examiner*—John Adee
*Attorneys*—Joseph C. Kotarski, Henry H. Huth, Jerry B. Peterson, Van D. Harrison, Jr., Carroll Palmer and Kemon, Palmer and Estabrook

ABSTRACT: Method and apparatus for cooling a heated regenerated bed in a gas sorption process. Cooling gas is continually circulated through the heated bed in a closed cooling circuit; by maintaining a positive back pressure on the cooling circuit, no gas is permitted to leave the cooling circuit during the cooling step.

INVENTOR.
CLEM A. BARRERE JR.
BY
AGENT

METHOD FOR COOLING HEATED ADSORBENT BEDS

This invention relates to the recovery of condensables from gas streams through the use of sorbent beds. More specifically, it is concerned with the cooling of heated sorbent beds which have been heated to remove adsorbed condensables and which must now be cooled prior to their being contacted with a feed gas stream containing vaporized condensables.

The recovery of gasoline, light hydrocarbons, water, or other vaporized condensables from natural gas or other gas sources by flowing the gas stream through a sorbent bed, or adsorber, is well known. As used herein, the term vaporized condensables includes a readily available condensable gas, such as gasoline, other liquid hydrocarbons and water. Each sorbent bed, when saturated with adsorbed condensables, is regenerated by heating, usually by circulating a heated gas through the bed. The heated gas is then cooled at some point in the heating circuit and the condensed liquids are collected and removed as one of the desired products. In several schemes of recovery a series of beds are cycled through a sorbent phase in a sorption circuit, a heating or regenerating phase in a heating or regenerating circuit, and finally through a cooling phase in a cooling circuit. The cooling phase is designed to bring the heated, regenerated body to a temperature where it can again be exposed to the flowing stream of raw feed gas in the sorption circuit.

In one method of cooling the heated bed, a portion of the residue gas from the bed in the sorption circuit is flowed through the heated bed. In many process schemes this gas, after it flows through the bed being cooled, is discarded from the system. In several schemes the cooling of the heated bed is preceded by a displacement, or purge step, wherein heated regeneration gas present in the newly heated bed is displaced from it prior to the cooling step. This displacement, or purge step, is designed to prevent loss of the rich regeneration gas in the heated bed when subsequently it is placed in an open circuit cooling system.

I have now determined that in the cooling process, although the bed being cooled may have previously been submitted to a displacement or purge step, as much as 20 percent of the adsorbed condensables present in the bed prior to its being placed in the heating circuit are retained within the sorbent bed after it has been heated and purged. This fraction of adsorbed condensables is subsequently released to the cooling gas stream flowed through the bed during the cooling step. Obviously, if this stream of cooling gas is vented from the system, a serious loss of recoverable product occurs. For example, FIG. 1 shows the condensable content of the effluent gas from a typical bed in a cooling circuit for a 15 minute cooling phase which originally was saturated with condensables from a hydrocarbon gas stream, heated to vaporize the adsorbed condensables and purged. It is obvious that even after the purge steps, a substantial amount of condensables is released during the first 12 minutes of the cooling period.

An object of this invention is to increase the recovery of condensable hydrocarbons from a hydrocarbon-bearing gas.

Another object of this invention is to improve the efficiency of gas treating systems utilizing sorbent beds to recover condensable hydrocarbons.

Another object of this invention is to reduce the loss of adsorbed condensables from a heated sorbent bed when subsequently it is cooled by flowing a cooling gas therethrough.

Other objects of the invention will become apparent from the following description and disclosure of my invention.

With respect to the accompanying FIGS:

FIG. 1 has been discussed above and depicts the change in concentration of condensables in the effluent gas stream from a heated, regenerated bed being cooled in a typical open or closed cooling cycle as the cooling step proceeds.

Figure 2:
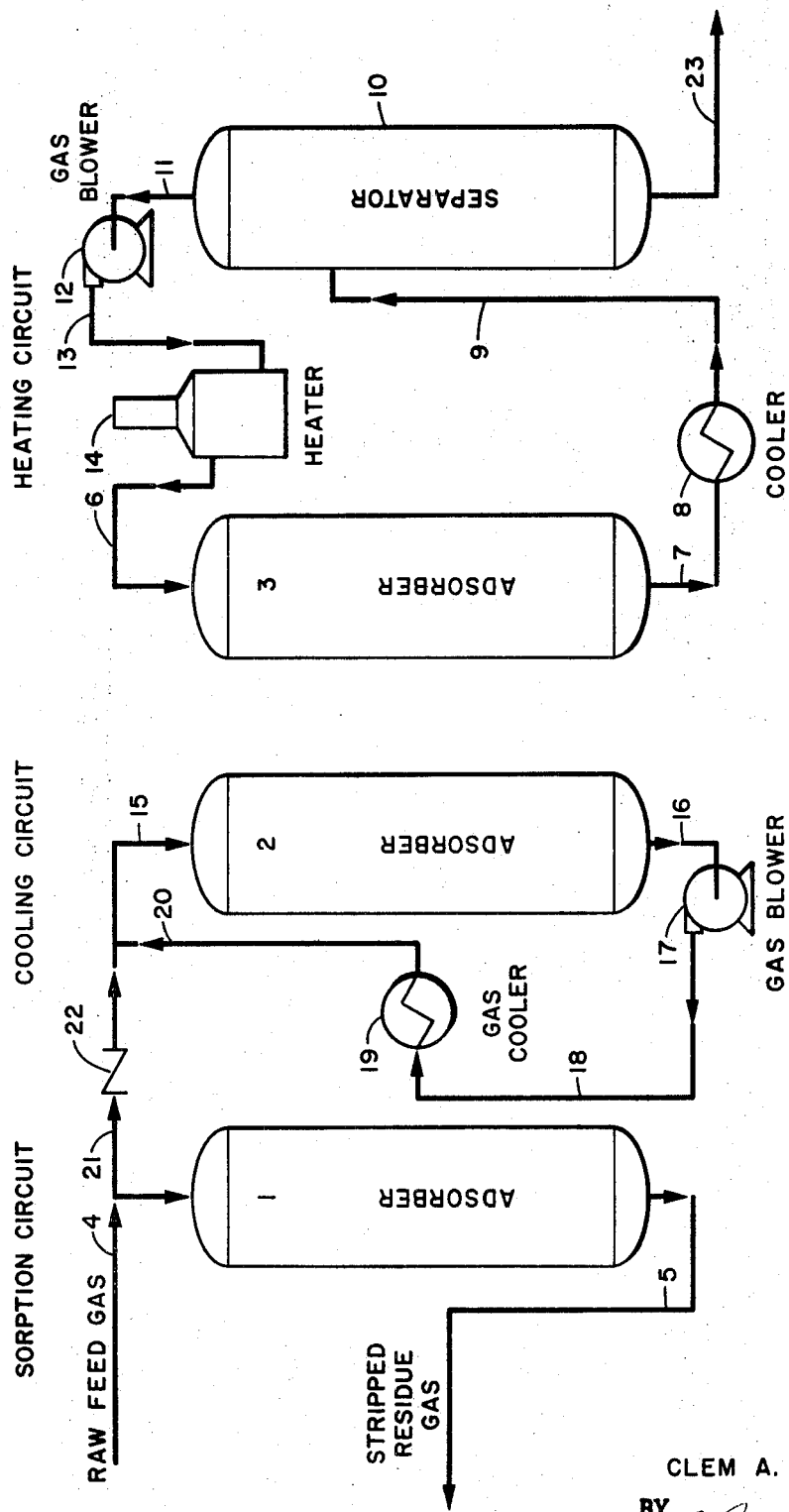

FIG. 2 depicts a conventional three-bed gas treating system in which there is a sorption circuit, cooling circuit, and heating circuit.

As previously stated, my invention comprises retaining all of the gas circulating through a bed in the cooling circuit within the circuit or, stated another way, preventing the escape of any of the circulating gas from the cooling circuit.

More specifically, in a process for the recovery of condensables from a gas stream wherein a sorbent body is contacted with the gas stream and the sorbent body containing sorbent condensables is heated to vaporize said condensables, my invention is the method of cooling the heated sorbent body in a cooling circuit comprising:

a. flowing a stream of cool gas into the heated sorbent body;

b. removing an effluent stream of gas from the heated sorbent body;

c. cooling the effluent stream of (b);

d. returning the cooled effluent stream to the stream of cool gas of (a); and e. retaining substantially all of the circulating stream of gas within the flow path defined by steps (a), (b), (c), and (d).

As discussed previously, a substantial amount of the recoverable, condensed hydrocarbons originally present in a sorbent bed prior to its being heated is lost during the subsequent cooling steps if the cooling gas is vented from the bed without further treatment. The fraction of condensables present in the effluent cooling gas from the bed being cooled may be as high as 13 mol-percent at the beginning of the cooling cycle. The fraction of condensables will diminish as the cooling step continues but may remain at an appreciably high level for an extended period, so that a substantial loss of product occurs.

FIG. 2 represents a preferred embodiment of our invention and depicts generally a three-bed gas treating system in which there are sorption, cooling and heating circuits.

The sorption circuit comprises a raw feed gas source flowing through conduit 4. The raw feed gas flows through adsorber 1 where condensables are adsorbed and stripped; residue gas flows out through conduit 5. Such sorption circuits are, of course, well known in the prior art.

The heating circuit comprises, in general, a heating gas conduit 6 which conducts heated, regeneration gas to adsorber 3, conduit 7 which conducts effluent gas from adsorber 3 to cooler 8, conduit 9, separator 10, conduit 11, gas blower 12, conduit 13, and heater 14 to complete the closed heating circuit. Heating circuits of this type are generally known, and are used to vaporize condensables adsorbed by a sorbent bed in a sorption circuit as discussed previously.

The cooling circuit depicted in FIG. 2 includes cooling gas conduit 15, which conducts cooling gas to the adsorber 2. Adsorber 2 is a heated sorbent body from which most of the adsorbed condensables have been removed by a hot stream of gas in a heating circuit as described above. Effluent gas from adsorber 2 flows through conduit 16, gas blower 17, conduit 18, cooler 19, conduit 20 and is returned to adsorber 2. As depicted in FIG. 2, conduit 21 connects the cooling circuit and the sorbent circuit. A check valve 22 is located intermediate conduit 21 and permits flow only from conduit 4 to conduit 20. As cooling gas is circulated through adsorber 2, the temperature within the circuit declines; correspondingly, the pressure also declines, due to the shrinkage of gas volume. The gas pressure in conduit 21 is maintained at a pressure in excess of that in the cooling circuit. Consequently, as pressure in the cooling circuit decreases, a volume of gas will flow through conduit 21 into the cooling circuit, and accordingly, no gas ever leaves the cooling circuit during the cooling step. As adsorber 2 is cooled, the condensables present in the recirculated cooling gas are adsorbed in the cooler portion of the adsorber bed, normally the topmost part of the adsorber. In the event pressure in conduit 20 ever exceeds the pressure in conduit 4, check valve 22 prevents the escape of gas from conduit 20 into conduit 4.

As noted previously, adsorber 2 prior to its being cooled may be subjected to a gas purge or displacement step.

FIG. 2 shows the feed gas in conduit 4 being used as the gas source to impose a back pressure on the cooling circuit by means of conduit 21. It will be apparent that some other back pressure source of relatively lean gas can be utilized as well. For example, the residue gas line 5 could be used, as long as the pressure therein is in excess of the gas pressure in the cooling circuit.

EXAMPLE

Raw feed gas is processed by a system as shown in FIG. 2. Adsorbers 1, 2 and 3 each operate about 20 minutes in the sorption circuit, 20 minutes in the heating circuit and 20 minutes in the cooling circuit for a 60-minute cycle time. Each adsorber is switched from one circuit to the next in response to the measurement of the exit gas temperature in conduit 7 reaching 250° F. Feed gas in conduit 4 is at about 80° F. and 500 p.s.i.a. and flows at a rate of 22,600 Mcf/day. Adsorbers 1, 2, and 3 each have a volume of 570 ft.$^3$, and operate at a pressure of about 450 p.s.i.a. to 550 p.s.i.a. Each adsorber contains about 16,000 lbs. of activated carbon (8 to 10 mesh). Adsorbent temperature is about 120° F. during adsorption, a maximum of 600° F. and an average of 500° F. during reactivation and is cooled to about 200° F. during the cooling phase. Residue gas in an amount of about 17,400 Mcf/day at about 100° to 250° F. and 490 p.s.i.a. is produced by way of conduit 5. Reactivation gas is circulated in conduit 6 in an amount of about 15,700 Mcf/day at about 625° F. and 490 psia. Gas in conduit 7 has a temperature of about 140° F. Separator 10 operates at about 80° F. and 485 p.s.i.a. Raw liquid product is removed by way of conduit 22 in an amount of about 50,000 gal./day. Cooling gas circulates through the cooling circuit in an amount of about 19,000 Mcf/day at 495 p.s.i.a. and 90° F. Heater 14 is designed for a duty of 14×10$^6$ Btu/hr. Average compositions at various points throughout the system are tabulated below:

| Conduit: | Mol percent | | | | | |
|---|---|---|---|---|---|---|
| | $CH_4$ | $C_2H_6$ | $C_3H_8$ | $C_4H_{10}$ | $C_5H_{12}$ | $C_6H_{14}$ plus |
| 4 | 89.63 | 6.32 | 2.17 | 1.20 | 0.46 | 0.22 |
| 5 | 93.36 | 6.61 | 0.02 | 0.01 | 0.00 | 0.00 |
| 6 | 69.31 | 10.72 | 15.17 | 4.10 | 0.70 | ------- |
| 15 | 92.43 | 6.50 | 0.46 | 0.48 | 0.08 | 0.05 |

The pressure in conduit 21 averages 495 p.s.i.a.

In the cooling circuit the composition of gas flowing through conduit 16 during each cycle varies with the lapse of time from the beginning of the cooling cycle as tabulated below.

| Time lapsed: | Mol percent | | | | | |
|---|---|---|---|---|---|---|
| | $CH_4$ | $C_2H_6$ | $C_3H_8$ | $C_4H_{10}$ | $C_5H_{12}$ | $C_6H_{14}$ plus |
| 5 | 89.30 | 6.31 | 2.18 | 2.00 | 0.06 | 0.15 |
| 10 | 92.66 | 6.50 | 0.32 | 0.34 | 0.12 | 0.06 |
| 15 | 93.09 | 6.54 | 0.18 | 0.08 | 0.11 | 0.00 |
| 20 | 93.38 | 6.61 | 0.00 | 0.00 | 0.00 | 0.01 |

Recirculation of this gas to the adsorber in the cooling circuit prevents the loss of 320 gallons of liquid product per cycle. None of this product is lost through conduit 21 since the gas pressure in conduit 21 is maintained always in excess of that in conduit 20.

Having thus described the invention by providing a specific example thereof, it is to be understood that no undue limitations or restrictions are to be drawn by reason thereof and that many variations and modifications are within the scope of the invention.

I claim:

1. In a process for the recovery of condensables from a gas stream wherein a cool sorbent body is contacted with said gas stream and said sorbent body containing sorbent condensables is heated to vaporize said condensables, the method of cooling said heated sorbent body for recontacting said gas stream which comprises:
   a. flowing a stream of cool gas into said heated sorbent bodies;
   b. removing an effluent stream of gas from said heated sorbent body;
   c. cooling said sorbent effluent stream of (b);
   d. returning said cooled effluent stream to said stream of cool gas of (a); and
   e. retaining essentially all of said circulating stream of gas within the flow path defined by steps (a), (b), (c), and (d) by maintaining a gas back pressure on the flow path defined by said steps (a), (b), (c), and (d) said back pressure being sufficient to maintain said gas within said defined flow path.

2. The method of claim 1 wherein step (e) comprises maintaining a gas back pressure on the flow path defined by steps (a), (b), (c), and (d) from an exterior gas pressure source, said back pressure being sufficient to maintain said gas within said defied flow path.

3. The method of claim 2 wherein the source of said back pressure is a lean gas.

4. The method of claim 3 wherein said lean gas is a feed gas.

5. The method of claim 3 wherein said lean gas is stripped residue gas.

6. A cyclical process for the recovery of condensables from a raw feed gas stream comprising:
   a. flowing said raw gas stream through a sorbent body wherein condensables are adsorbed;
   b. removing a stripped residue gas stream from said first sorbent body;
   c. flowing a heated regeneration gas stream through said sorbent body wherein condensables are adsorbed thereby heating said sorbent body and vaporizing condensables into said flowing heated gas streams;
   d. cooling said flowing heated gas stream thereby condensing said vaporized condensables;
   e. collecting said condensed condensables of (d);
   f. flowing a cooling gas stream through said heated sorbent body of (c);
   g. cooling the effluent stream of cooling gas from said heated sorbent body of (f);
   h. recycling all of the cooled effluent gas stream of (g) to the heated sorbent body of (f);
   i. maintaining said cooling gas stream in fluid communication with a source of gas at a pressure sufficient to maintain said cooling gas stream within its defined flow path; and
   j. confining all gas entering the flow path defined by steps (f), (g), and (h) to said flow path.

7. The method of claim 6 wherein said source of gas in (i) is said feed gas stream of (a).

8. The method of claim 6 wherein said source of gas in (i) is said stripped residue gas stream of (b).

9. The method of claim 6 wherein said source of gas in (i) is a gas other than the feed gas stream of (a) and the stripped residue gas stream of (b).

10. The method of claim 6 wherein each of a series of sorbent bodies is sequentially cycled through the steps of claim 6.

11. The method of claim 6 wherein prior to said step of cooling of (d) the gas present in said heated sorbent body of (c) is displaced by a lean gas into another sorbent body in which said step of flowing a heated regeneration gas of (c)

12. The method of claim 1 wherein step (e) comprises retaining essentially all of said circulating stream of gas within the flow path defined by steps (a), (b), (c), and (d) by means of a check valve situated in a conduit between said flow path and an exterior gas pressure source.

13. The method of claim 12 wherein the exterior gas pressure source is the lean gas pressure source.

14. The method of claim 12 wherein the exterior gas pressure source is a feed gas pressure source.

15. The method of claim 12 wherein the exterior gas pressure source is a stripped residue gas pressure source.

PO-1050
(5/69)

UNITED STATES PATENT OFFICE
CERTIFICATE OF CORRECTION

Patent No. 3,577,867                   Dated July 8, 1971

Inventor(s) Clem A. Barrere, Jr.

It is certified that error appears in the above-identified patent and that said Letters Patent are hereby corrected as shown below:

Column 4, line 15 should read "said defined flow path" --

Column 4, line 58 should read "which said step of flowing a heated regeneration gas of (c) is next to be conducted.

Signed and sealed this 23rd day of November 1971.

(SEAL)
Attest:

EDWARD M. FLETCHER, JR.          ROBERT GOTTSCHALK
Attesting Officer                Acting Commissioner of Patents